United States Patent
Amemiya (10) Patent No.: US 8,278,000 B2
(45) Date of Patent: Oct. 2, 2012

(54) HIGH PERFORMANCE PROTON EXCHANGE MEMBRANE (PEM) FUEL CELL

(75) Inventor: Kazuki Amemiya, Somers, CT (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1041 days.

(21) Appl. No.: 12/238,263

(22) Filed: Sep. 25, 2008

(65) Prior Publication Data

US 2010/0075186 A1     Mar. 25, 2010

(51) Int. Cl.
 H01M 2/18    (2006.01)
 H01M 8/04    (2006.01)
 H01M 2/08    (2006.01)
 H01M 8/02    (2006.01)

(52) U.S. Cl. ............. 429/457; 429/435; 429/514

(58) Field of Classification Search ............ None
See application file for complete search history.

(56) References Cited

U.S. PATENT DOCUMENTS

| | | | |
|---|---|---|---|
| 6,218,038 | B1 | 4/2001 | Oko et al. |
| 7,935,452 | B2 * | 5/2011 | Kaye .................. 429/460 |
| 2003/0186107 | A1 * | 10/2003 | Maston et al. ........... 429/38 |
| 2003/0207165 | A1 | 11/2003 | Skala et al. |
| 2004/0157103 | A1 * | 8/2004 | Takeguchi et al. ........ 429/32 |
| 2005/0191541 | A1 | 9/2005 | Gurau et al. |
| 2005/0221158 | A1 * | 10/2005 | Yamauchi et al. ........ 429/38 |
| 2008/0107952 | A1 * | 5/2008 | Farrington .............. 429/34 |

FOREIGN PATENT DOCUMENTS

DE   102 29 820   2/2004
EP   1 439 593    7/2004

OTHER PUBLICATIONS

International Search Report and Written Opinion, for PCT/US2009/058024, dated Jan. 25, 2010.
International Preliminary Report on Patentability for PCT/US2009/058024 dated Apr. 7, 2011.

* cited by examiner

*Primary Examiner* — Krishnan S Menon
(74) *Attorney, Agent, or Firm* — Finnegan, Henderson, Farabow, Garrett & Dunner, LLP (57) ABSTRACT

A fuel cell includes a membrane electrode assembly (MEA), at least one separator plate disposed on a first side of the MEA, and at least one separator plate disposed on a second side of the MEA. The separator plate on the first side of the MEA may form a first group of channels for conducting a first reactant. The separator plate disposed on the second side of the MEA may form a second group of channels for conducting a second reactant. The first group of channels include a first set and a second set of channels alternatively positioned. Each of the first set of channels is positioned adjacent to a channel of the second set. Each of the two sets of channels includes an input controlled by an input valve and an output controlled by an output valve. The first group of channels forms an interdigitated flow field by closing the input valve of one of the two sets of channels and closing the output valve of the other of the two sets of channels, and forms a conventional flow field by opening both the input valve and the output valve.

18 Claims, 6 Drawing Sheets

HIGH PERFORMANCE PROTON EXCHANGE MEMBRANE (PEM) FUEL CELL

TECHNICAL FIELD

The present disclosure relates generally to a proton exchange membrane (PEM) fuel cell, and more particularly, to a PEM fuel cell with a changeable flow field between an Interdigitated Flow Field (IDFF) configuration and a Conventional Flow Field (CFF) configuration.

BACKGROUND

A proton exchange membrane (PEM) fuel cell, also known as a polymer electrolyte membrane (PEM) fuel cell, uses fuel, e.g., hydrogen, and oxidant, e.g., oxygen, to produce electricity, transforming the chemical energy liberated during the electrochemical reaction of the fuel and oxygen into electrical energy. A PEM fuel cell generally employs a membrane electrode assembly (MEA), which includes a PEM disposed between two porous electrically conductive electrode layers. An electro catalyst is typically disposed at each membrane/electrode layer interface to induce the desired electrochemical reaction. In a typical PEM fuel cell, the MEA is disposed between two electrically conductive separator plates. Each separator plate employs a fluid flow field that directs the fuel or the oxidant to the respective electro catalyst layers.

A simple fluid flow field may include a chamber open to an adjacent porous electrode layer with a first port serving as a fluid inlet and a second port serving as a fluid outlet. More complicated fluid flow fields incorporate at least one fluid channel between the inlet and the outlet for directing the fluid stream in contact with the electrode layer or a guide barrier for controlling the flow path of the reactant through the flow field. The fuel stream directed to the anode by the fuel flow field migrates through the porous anode, and is oxidized at the anode electro catalyst layer. The oxidant stream directed to the cathode by the oxidant flow field migrates through the porous cathode and is reduced at the cathode electro catalyst layer.

Various designs of the flow field have been developed. For example, a Conventional Flow Field (CFF) design uses a number of channels between an input and an output and is configured to provide a relatively uniform reactant distribution on the electrode. In this conventional configuration, the reactant flowing in the channels may distribute into the electrode and react with the other reactant. However, some reactant may flow directly from the input to the output, without entering into the electrode, and therefore, the reactant utilization rate is relatively low. To increase the reactant utilization efficiency, an Interdigitated Flow Field (IDFF) design has been developed. An IDFF includes a set of inlet flow channels and a set of outlet flow channels, and the inlet flow channels are not connected to the outlet flow channels. In an ITFF, the reactant gas in the inlet flow channels is forced into the adjacent porous electrode and the chance for the reactant gas to contact with the catalyst is increased, and thereby, the reactant utilization efficiency is increased. The IDFF configuration can provide higher cell performance and lower fuel consumption as the fuel gas is more efficiently diffused to the electrodes. However, the IDFF configuration also has some disadvantages. For example, in an IDFF, the membrane electrode assembly might be more easily dried out, particularly when the fuel cell operates at a high temperature.

Therefore, there remains a need for a new flow field design for a fuel cell that can increase the fuel cell overall performance.

SUMMARY

According to one aspect, the present disclosure is directed to a fuel cell. The fuel cell includes a membrane electrode assembly, at least one separator plate disposed on a first side of the membrane electrode assembly, and at least one separator plate disposed on a second side of the membrane electrode assembly. The separator plate disposed on the first side of the membrane electrode assembly may form a first group of channels on the membrane electrode assembly for conducting a first reactant. The first group of channels includes a first set and a second set of channels alternatively positioned. Each of the first set of channels is positioned adjacent to a channel of the second set. The at least one separator plate disposed on the second side of the membrane electrode assembly may form a second group of channels on the second side of the membrane electrode assembly for conducting a second reactant. Each of the two sets of channels includes an input controlled by an input valve and an output controlled by an output valve. The first group of channels may form an interdigitated flow field by closing the input valve of one of the two sets of channels and closing the output valve of the other of the two sets of channels, and may form a conventional flow field by opening both the input valve and the output valve.

According to another aspect, a fuel cell assembly includes a plurality of fuel cells stacked together Each fuel cell includes a membrane electrode assembly. A first group of channels are formed on a first side of the membrane electrode assembly for conducting a first reactant. The first group of channels include a first set of channels and a second set of channels alternatively positioned. The first set of channels are connected between a first input manifold and a first output manifold. The second set of channels are connected between a second input manifold and a second output manifold. Each manifold is controlled by a valve. A second group of channels are formed on a second side of the membrane electrode assembly for conducting a second reactant. The first group of channels may be configured to a conventional flow field by opening all the manifolds, and configured to an interdigitated flow field by closing the first output manifold and the second input manifold.

BRIEF DESCRIPTION OF THE DRAWINGS

The accompanying drawings are included to provide a further understanding of the invention and are incorporated in and constitute a party of the specification, illustrate preferred embodiments of the invention and together write the detailed description serve to explain the principles of the invention.

DETAILED DESCRIPTION OF THE PREFERRED EMBODIMENTS

Figure 1:
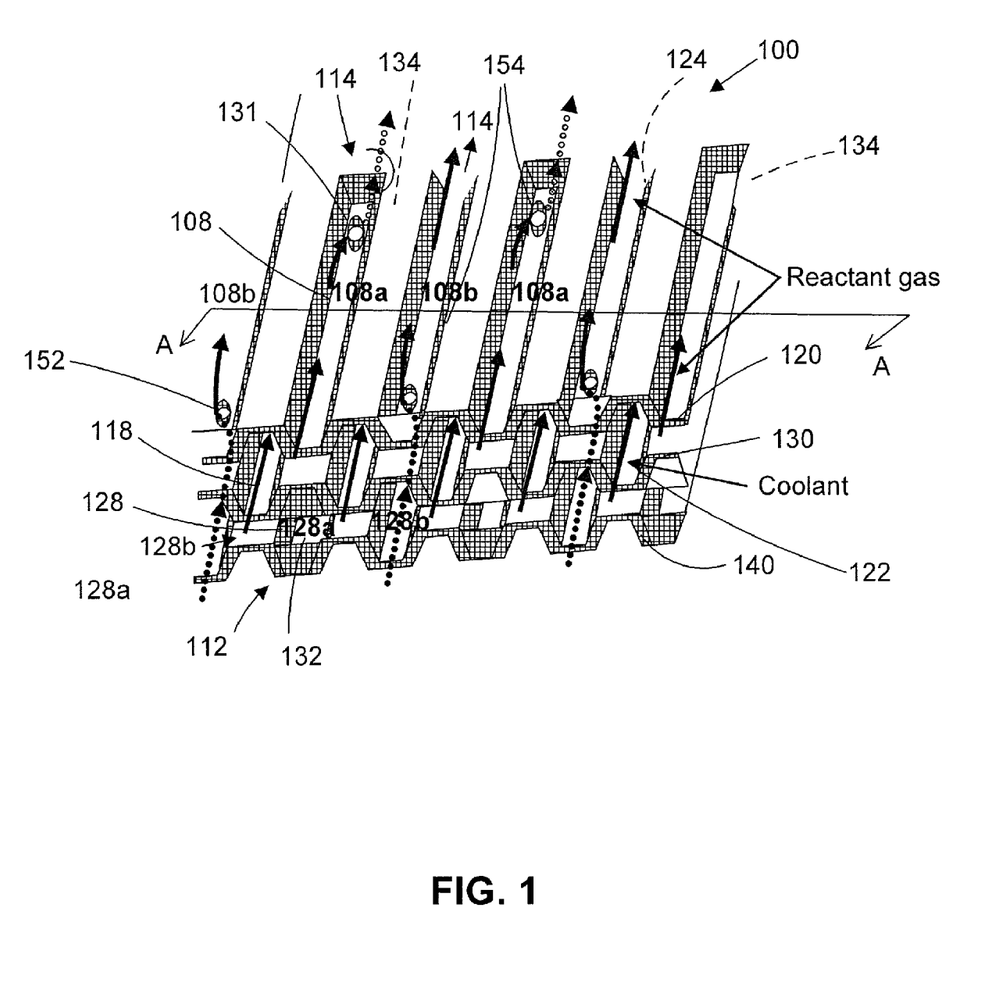
FIG. 1 is a perspective view of a portion of a fuel cell system according to a preferred embodiment of the invention.
Figure 2:
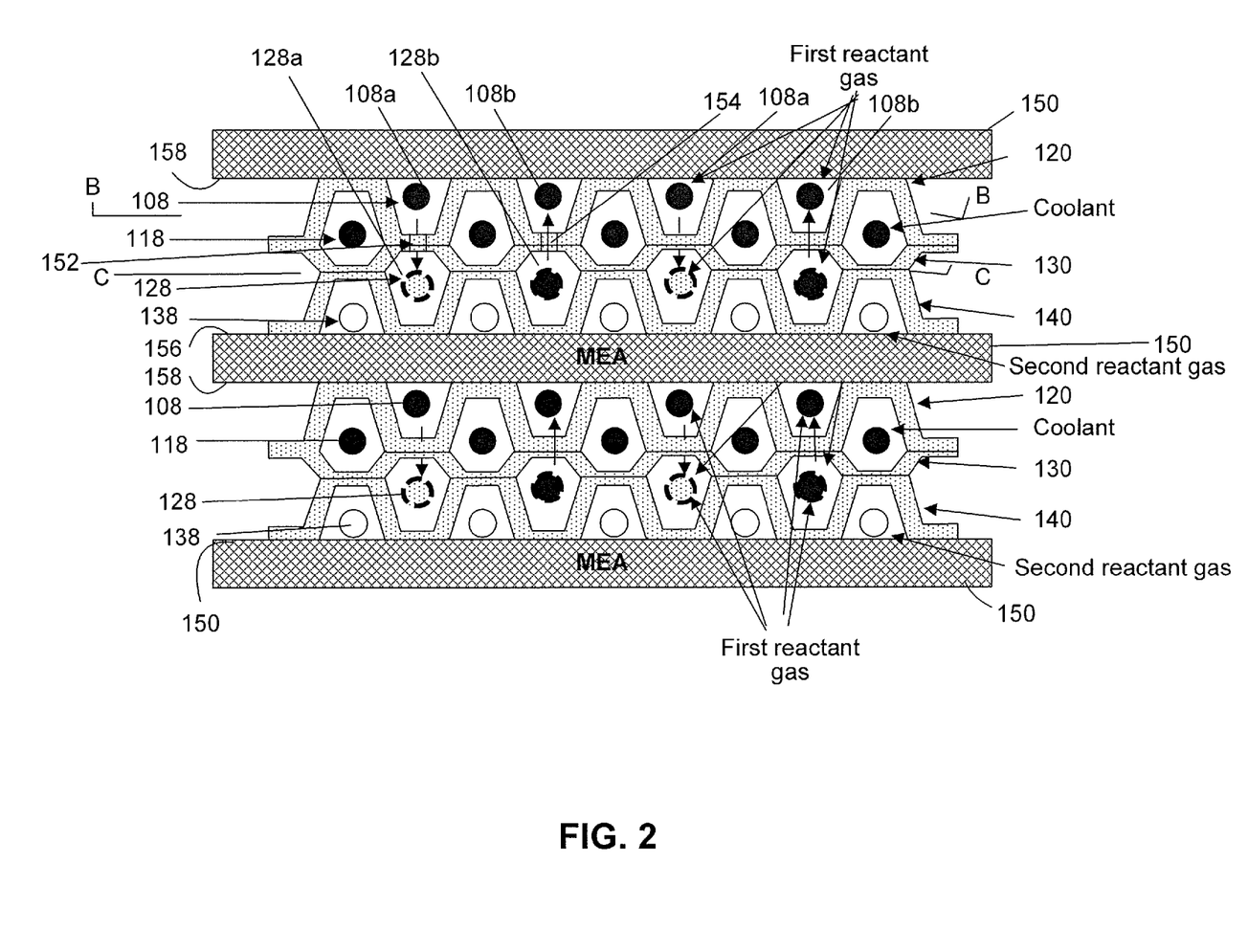
FIG. 2 is a cross-sectional view of the portion of the fuel cell along line A-A of FIG. 1 according to a preferred embodiment of the invention.

In accordance with the invention, PEM fuel cell assembly as broadly embodied herein, includes a plurality of fuel cells, which are electrically connected in series. Each fuel cell, according to the present invention, may be constructed by separator plates and membrane electrode assemblies disposed between the separator plates. FIG. 1 broadly depicts a perspective view of a section of a fuel cell 100 that includes three separator plates 120, 130, and 140, stacked together. FIG. 2 broadly depicts a cross-sectional view of two sets of the separator plates depicted in FIG. 1 together with membrane electrode assemblies, taken along line A-A in FIG. 1. As shown in FIG. 2, the fuel cell 100 may include two sets of the separator plates as shown in FIG. 1, stacked together with a membrane electrode assembly 150 disposed therebetween. The separator plates and the membrane electrode assemblies form channels therebetween, through which the reactant gases and coolant can pass through.

In a preferred embodiment, as broadly depicted in FIGS. 1 and 2, each separator plate has a substantial trapezoidal-waveform shape cross-section. The three separator plates 120, 130, and 140 and the membrane electrode assemblies 150 form a plurality of channels distributed in three groups, a first group of channels 108 and 128 formed on a first side of the membrane electrode assembly for conducting a first reactant, a second group of channels 138 formed on a second side of the membrane electrode assembly for conducting a second reactant, and a third group of channels 118 for conducting coolant. The channels 108 are formed by the first separator plate 120 and a membrane electrode assembly 150 provided adjacent to the first separator plate 120. The channels 108 include channels 108a and channels 108b which are alternately positioned. The channels 128 are formed by the second separator plate 130 and the third separator plate 140. The channels 128 include channels 128a and channels 128b which are alternately positioned. The first group of channels 108 and 128 includes a first set of channels 108a and 128a, and a second set of channels 108b and 128b. The first set of channels 108a and 128a includes a first sub-set of channels 108a and a second sub-set of channels 128a. The second set of channels 108b and 128b includes a first sub-set of channels 108b and a second sub-set of channels 128b. The second group of channels 138 are formed by the third separator plate 140 and a membrane electrode assembly 150 provided adjacent to the third separator plate 140. The third group of channels 118 are formed by the first separator plate 120 and the second separator plate 130.

As an example, the trapezoidal-waveform shape separator plate 120 may define a series of substantially trapezoidal-shaped recesses including a first set of recesses facing in a first direction (e.g., facing upward in FIG. 2) and a second set of recesses facing in a second direction (e.g., facing downward in FIG. 2). The recesses facing upward and the recesses facing downward are positioned alternatively. As shown in FIG. 2, the recesses facing upward with the adjacent membrane electrode assembly 150 above the separator plate 120 define the channels 108 and the recesses facing downward with the adjacent second separator plate 130 define the channels 118. The other channels are defined in a similar way as described above and as shown in FIG. 2.

Figure 3:
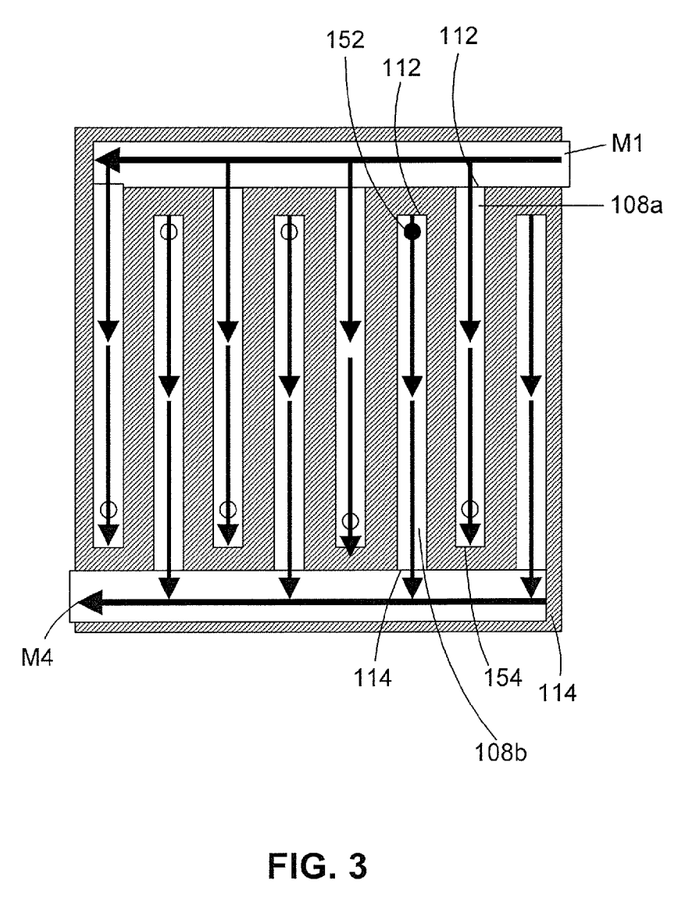
FIG. 3 shows a cross-sectional view of a group of channels taken along line B-B in FIG. 2 according to a preferred embodiment of the invention.

FIG. 3 shows a cross-sectional view of the channels 108 taken along line B-B in FIG. 2. As shown in FIG. 3, the channels 108 include channels 108a and channels 108b. As shown in FIG. 3, the channels 108a and the channels 108b are positioned alternately, such that each channel of the channels 108a is adjacent to a channel of the channels 108b. Each of the channels 108 extends between a first end 112 and a second end 114. The first end 112 of the channels 108a defines an opening and the second end 114 of the channels 108a is blocked. The first end 112 of the channels 108b is blocked and the second end 114 of the channels 108b defines an opening.

Figure 4:
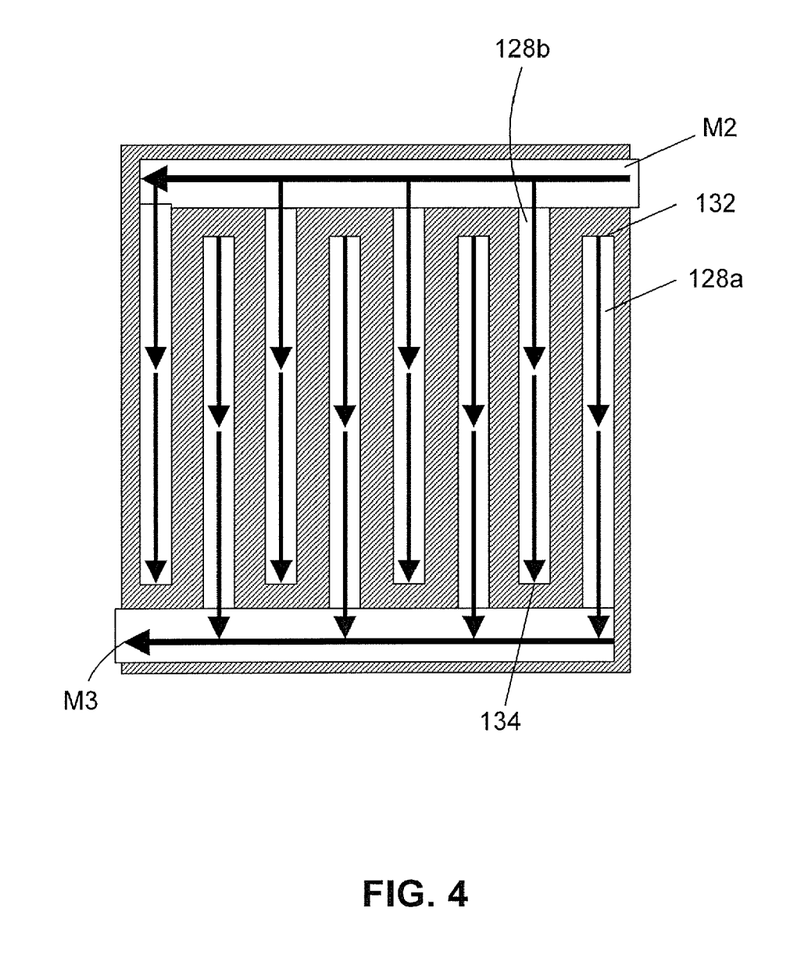
FIG. 4 shows a cross-sectional view of another group of channels taken along line C-C in FIG. 2 according to a preferred embodiment of the invention.

FIG. 4 shows a cross-sectional view of the channels 128 taken along line C-C in FIG. 2. As shown in FIG. 4, the channels 128 include channels 128a and channels 128b. Each of the channels 128 extends between a first end 132 and a second end 134. The first end 132 of the channels 128a is blocked and the second end 134 of the channels 128a defines an opening. The first end 132 of the channels 128b defines an opening and the second end 134 of the channels 128b is blocked. Each of the second group of channels 138 extends between two ends, both of which are open. Similarly each of the third group of channels 118 extends between two ends, both of which are open.

Each of the channels 108a is in fluid communication with an adjacent channel 128a through a hole 154 defined at a point close to the second end of the channels 108a and 128a. Each of the channels 108b is in fluid communication with an adjacent channel 128b through a hole 152 defined at a point close to the first end of the channels 108b and 128b.

Figure 5:
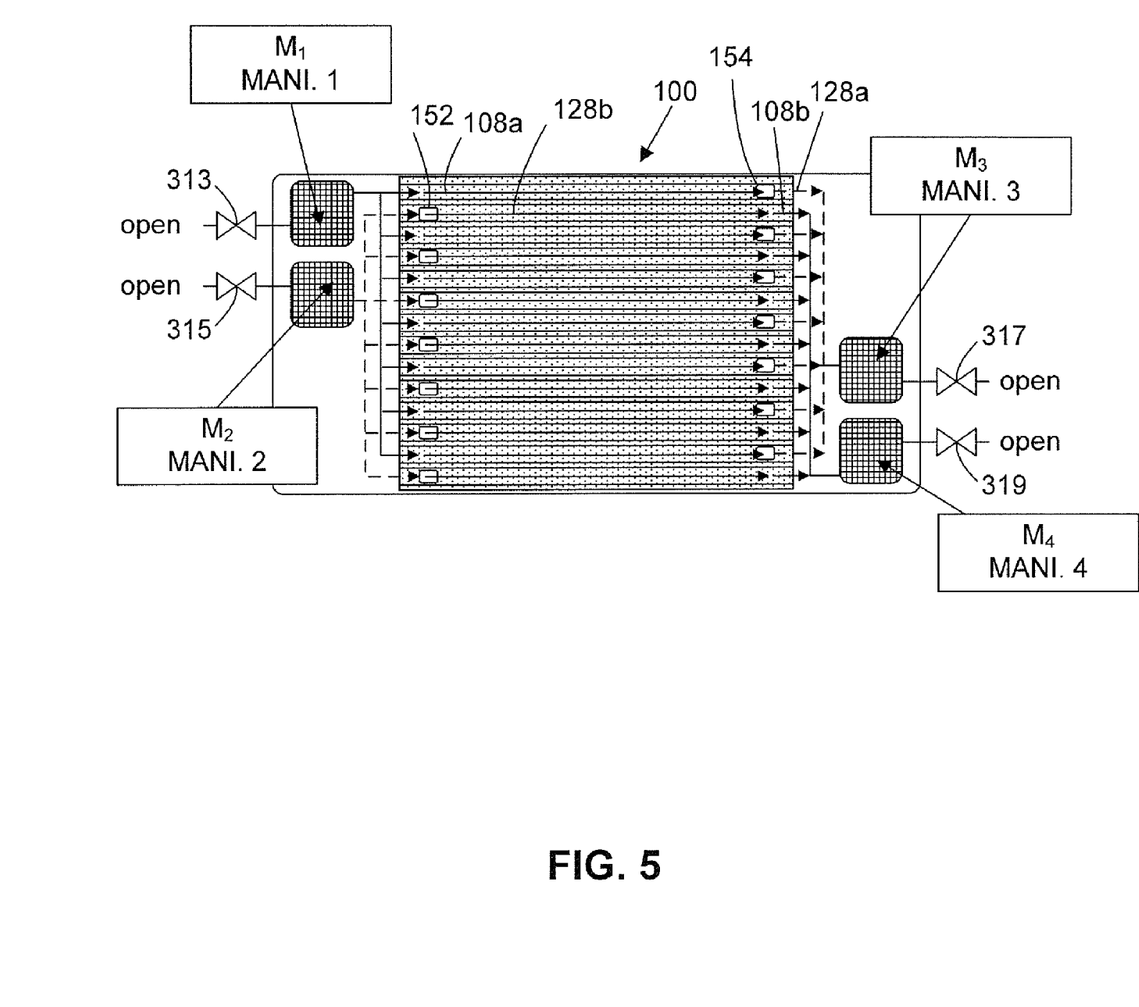
FIG. 5 is a plan view of an exemplary disclosed fuel cell employing a Conventional Flow Fields configuration according to a preferred embodiment of the invention.
Figure 6:
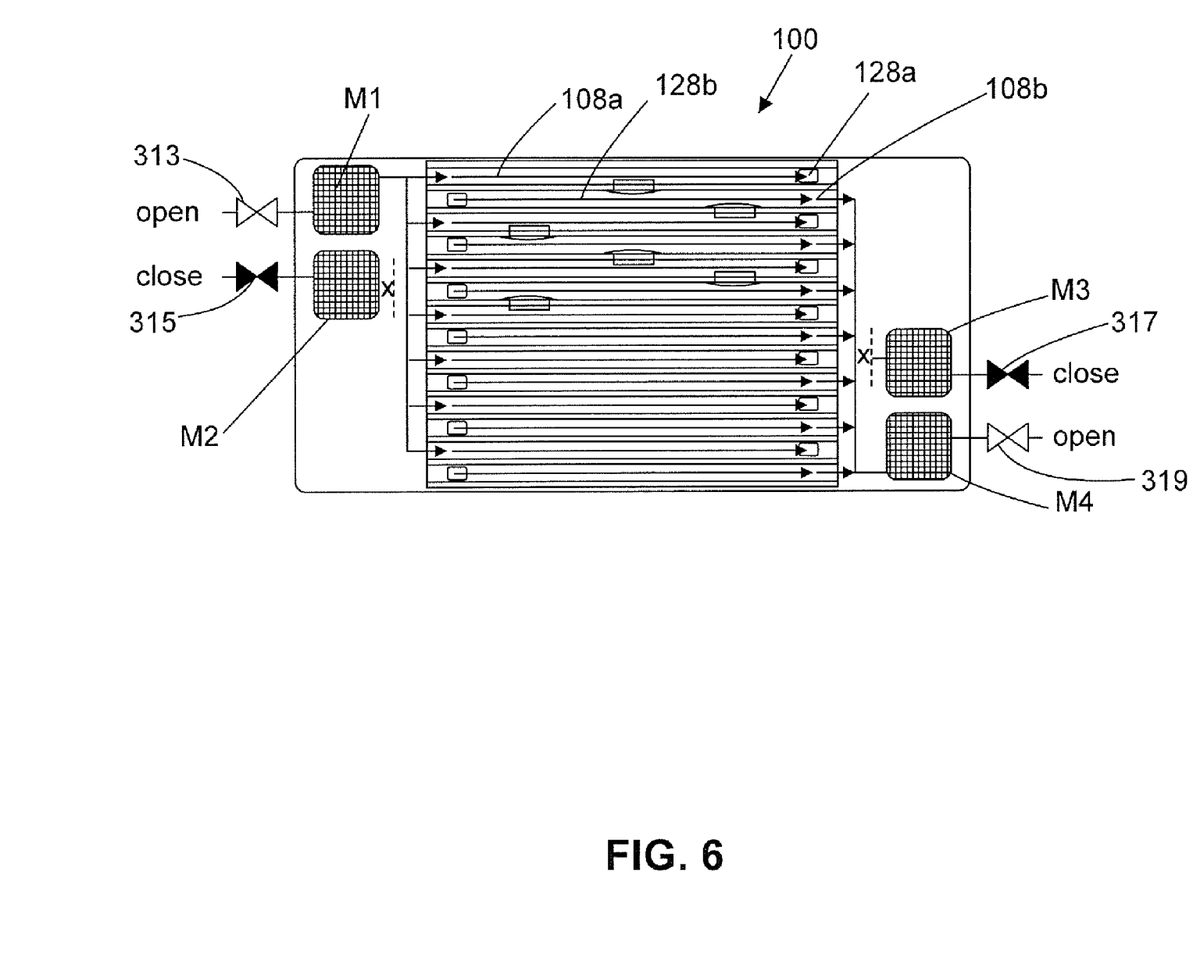
FIG. 6 is a plan view of an exemplary disclosed fuel cell employing an Interdigitated Flow Fields configuration according to a preferred embodiment of the invention.

As broadly embodied in FIGS. 5 and 6, the channels 108a and 128a are connected between a first input manifold M1 and a first output manifold M3. The channels 108b and 128b are connected between a second input manifold M2 and a second output manifold M4. As denoted by the solid arrows in FIGS. 1 and 5, the first end 112 of the channels 108a is connected to the input manifold M1 and the second end 114 of the channels 108b is connected to the output manifold M4. As denoted by the dotted arrows in FIGS. 1 and 5, the first end of the channels 128b is connected to the input manifold M2 and the second end of the channels 128a is connected to the output manifold M3. Manifold M1 is controlled by a valve 313, manifold M2 is controlled by a valve 315, manifold M3 is controlled by a valve 317, and manifold M4 is controlled by a valve 319. The first group of channels 108 and 128 can be configured to a CFF by opening all the manifolds, and alternately can he configured to an IDFF flow filed by closing one input manifold, e.g., M2, and one output manifold, e.g., M3.

The membrane electrode assembly 150 may be a typical membrane electrode assembly used in fuel cells, for example, including a proton exchange membrane (PEM), catalyst, and electrodes. The electrodes may be formed on porous substrates. The PEM is sandwiched between two electrodes which have the catalyst imbedded in them. The PEM forms a proton permeable but electrical insulative barrier. The electrodes are electrically insulated from each other by the PEM. One electrode constitutes an anode 156 and the other electrode constitutes a cathode 158 of the fuel cell 100. The PEM allows the transportation of the protons from the anode 156 to the cathode 158 through the membrane but forces the electrons to travel around a conductive path to the cathode 158.

In use, one reactant, for example, the pressurized hydrogen gas ($H_2$) enters the fuel cell 100 through the channels 138 to the anode side 156 of the membrane electrode assembly 150. Another reactant, for example, oxygen gas ($O_2$)) enters the fuel cell 100 through the channels 108 and 128 to the cathode side 158 of the membrane electrode assembly 150. Each of the anode side 156 and the cathode side 158 includes catalyst.

The hydrogen gas and the oxygen gas react at the membrane electrode assembly 150 and the reaction generates electricity and water. The channels 118 are cooling channels. Coolant may flow through the channels 118 to cool the fuel cell 100.

FIG. 5 illustrates a schematic view of the fuel cell 100 in a CFF configuration. As shown in FIG. 5, in the CFF configuration, the valves 313 and 315 may both be open and the input manifolds M1 and M2 may both supply a reactant gas to the fuel cell 100. The valves 317 and 319 also may both be open, and the output manifolds M3 and M4 may both allow the reactant gas to flow out of the fuel cell 100. Specifically, one of the reactant gases, for example, the oxygen gas, may flow from the input manifold M1 into the channels 108a, and enter into the channels 128a through the holes 154 therebetween. The oxygen gas in the channels 108a may diffuse to the cathode side 158 of the membrane electrode assembly 150, and react with the hydrogen gas that is introduced by the channels 138 into the anode side 156 of the membrane electrode assembly 150. The oxygen gas in the channels 108a and 128a may exit through the output manifold M3, which is connected to the channels 128a. The oxygen gas may also flow into the channels 128b from the second input manifold M2, and enter into the corresponding channels 108b through the holes 152 therebetween. The oxygen in the channels 108b may diffuse into the membrane electrode assembly 150 and react with the hydrogen. The oxygen in the channels 108b and 128b may exit the fuel cell 100 from the second output manifold M4.

The fuel cell 100 can also be configured with an IDEF configuration. For example, as shown in FIG. 6, in the IDFF configuration, the valves 315 and 317 are closed, and the valves 313 and 319 are open. As a result, the input manifold M1 is open, and the input manifold M2 is closed, and the output manifold M3 is closed and the output manifold M4 is open. One of the reactant gases, for example, oxygen gas may flow from the input manifold M1 into the channels 108a, and then enters into the channels 128a through the holes 154 between the channels 108a and the channels 128a. Because the second end 114 of the channels 108a is blocked, and the output manifold M3, which is connected to the second end 134 of the channels 128a is closed, the oxygen gas cannot flow out either through the channels 108a or channels 128a. Thereby, the oxygen gas is forced to diffuse into the cathode electrode 158 of the adjacent membrane electrode assembly 150. The oxygen in the membrane electrode assembly 150 may diffuse into the adjacent channels 108b and 128b, and exits the channels 108b and 128b through the output manifold M4. While the oxygen gas is diffused into the membrane electrode assembly 150, the oxygen gas may come into contact with the catalyst at the cathode side 158 of the membrane electrode assembly 150 and react with the hydrogen. Because the oxygen gas is forced to diffuse into the membrane electrode assembly 150, where the oxygen gas may contact with the catalyst, in the IDFF configuration, the utilization rate of the oxygen gas is much higher than the CFF configuration.

FIGS. 1-6 depict that only one side of the membrane electrode assembly 150 (e.g., the cathode side) employs a flow field design that is interchangeable between a CFF configuration and an IDFF configuration. The other side (e.g., the anode side) uses a CFF configuration. However, a person skilled in the art will recognize that the other side may also use an interchangeable design or an IDFF configuration. In addition, FIGS. 1-6 only depict one fuel cell. A person skilled in the art will recognize that a plurality of fuel cells as depicted at FIGS. 1-6 can be stacked together to establish a fuel cell power plant.

Several advantages over the conventional fuel cell are associated with the fuel cell 100 according to the present disclosure. Either or both of anode side and cathode side of the fuel cell 100 can be switched between the IDFF configuration and the CEF configuration. The IDFF configuration can increase the fuel or oxidant efficiency. At a high temperature, under the IDFF configuration, the membrane electrode assembly may become dry. To prevent the membrane electrode assembly from drying out, either or both of the anode side and the cathode side of the fuel cell 100 may be switched to the CFF configuration. At a low temperature, either or both of the anode side and the cathode side of the fuel cell 100 may be switched to the IDFF configuration. For example, the fuel cell 100 can be switched to the IDFF configuration on either or both of the anode side and the cathode side at a low temperature, for example, below 0° C. The fuel cell 100 can be switched to a CFF configuration on either or both of the anode side and the cathode side in high temperature, for example, over 80° C. The switch between the IDFF configuration and the CFF configuration can be performed by switching on and off the valves that control the manifolds. For example, by opening all the valves on the manifolds, the fuel cell is in the CFF configuration, and by closing the input valve of one of the two sets of channels and closing the output valve of the other of the two set of channels, the fuel cell is on the IDFF configuration.

It will be apparent to those skilled in the art that various modifications and variations can be made to the fuel cell system. Other embodiments will be apparent to those skilled in the art from consideration of the specification and practice of the disclosed fuel cell system. It is intended that the specification and examples be considered as exemplary only, with a true scope of the invention being indicated by the following claims and their equivalents.

What is claimed is:

1. A fuel cell comprising:
   a membrane electrode assembly;
   first-side separator plates disposed on a first side of the membrane electrode assembly, the first-side separator plates comprising:
   a first separator plate, a second separator plate, and a third separator plate, the first-side separator plates forming a first group of channels on the membrane electrode assembly for conducting a first reactant, the first group of channels including a first set and a second set of channels alternatively positioned, wherein each channel of the first set of channels is positioned adjacent to a channel of the second set,
   wherein the first set of the first group of channels includes a first sub-set of channels and a second sub-set of channels, wherein each channel of the first sub-set of channels communicates with a corresponding channel of the second sub-set of channels through a hole,
   wherein the second set of the first group of channels includes a first sub-set of channels and a second sub-set of channels, wherein each channel of the first sub-set of channels communicates with a corresponding channel of the second sub-set of channels through a hole, and
   wherein the first separator plate forms the first sub-set of channels of the first set and the first sub-set of channels of the second set with the membrane electrode assembly, the second separator plate forms a third group of channels for conducting coolant with the first separator plate, and the third separator plate forms the second sub-set of channels of the first set and the second sub-set of channels of the second set with the second separator plate; and a second-side separator plate disposed on a second side of the membrane electrode assembly forming a second group of channels on the second side of the membrane electrode assembly for conducting a second reactant, wherein each of the two sets of channels includes an input controlled by an input valve and an output controlled by an output valve, wherein the first group of channels forms an interdigitated flow field by closing the input valve of one of the two sets of channels and closing the output valve of the other of the two sets of channels, and forms a conventional flow field by opening both the input valve and the output valve.

2. The fuel cell of claim 1, wherein the first-side separator plates on the first side of the membrane electrode assembly include a first plurality of recesses which form the first group of channels with the membrane electrode assembly.

3. The fuel cell of claim 1, wherein the second-side separator plate on the second side of the membrane electrode assembly includes a second plurality of recesses which form the second group of channels with the membrane electrode assembly.

4. The fuel cell of claim 1, wherein each of the two sets of channels is connected to an input manifold and an output manifold, and wherein the input valve and the output valve respectively control the input manifold and the output manifold.

5. The fuel cell of claim 1, wherein the first sub-set of channels of the first set is connected to an input manifold which is controlled by the input valve, and the second sub-set of channels of the first set is connected to an output manifold which is controlled by the output valve.

6. The fuel cell of claim 5, wherein, in the first set of channels, the holes fluidly connect each channel in the first sub-set and the corresponding channel in the second sub-set, wherein the holes are defined adjacent to the output manifold.

7. The fuel cell of claim 1, wherein the second sub-set of channels of the second set is connected to an input manifold which is controlled by the input valve, and the first sub-set of channels of the second set is connected to an output manifold which is controlled by the output valve.

8. The fuel cell of claim 7, wherein in the second set of channels, the holes fluidly connect each channel in the first sub-set and the corresponding channel in the second sub-set, wherein the holes are defined adjacent to the input manifold.

9. The fuel cell of claim 1, wherein the third separator plate further forms a group of channels with an adjacent membrane electrode assembly for conducting the second reactant.

10. The fuel cell of claim 1, wherein the second group of channels includes a first set and a second set of channels alternatively positioned, wherein each channel of the first set of channels is positioned adjacent to a channel of the second set, and wherein each of the two sets of channels of the second group of channels includes an input controlled by an input valve and an output controlled by an output valve, wherein the second group of channels forms an interdigitated flow field by closing the input valve of one of the two sets of channels and closing the output valve of the other of the two sets of channels, and forms a conventional flow field by opening both the input valve and the output valve.

11. The fuel cell of claim 1, wherein the first-side separator plate on the first side of the membrane electrode assembly or the second-side separator plate on the second side of the membrane electrode assembly is made from a material selected from a group consisting of C, Fe, Ni, Cr, Al, Ti, Au, and Pt.

12. A fuel cell assembly comprising a plurality of fuel cells of claim 1 stacked together.

13. A fuel cell assembly comprising a plurality of fuel cells stacked together, each fuel cell comprising:
a membrane electrode assembly;
first-side separator plates disposed on a first side of the membrane electrode assembly, the first-side separator plates comprising:
a first separator plate, a second separator plate, and a third separator plate;
a first group of channels formed on the first side of the membrane electrode assembly for conducting a first reactant, the first group of channels including a first set and a second set of channels alternatively positioned, the first set of channels being connected between a first input manifold and a first output manifold, and the second set of channels being connected between a second input manifold and a second output manifold, wherein each manifold is controlled by a valve
wherein the first set of the first group of channels includes a first sub-set of channels and a second sub-set of channels, wherein each channel of the first sub-set of channels communicates with a corresponding channel of the second sub-set of channels through a hole,
wherein the second set of the first group of channels includes a first sub-set of channels and a second sub-set of channels, wherein each channel of the first sub-set of channels communicates with a corresponding channel of the second sub-set of channels through a hole, and
wherein the first separator plate forms the first sub-set of channels of the first set and the first sub-set of channels of the second set with the membrane electrode assembly, the second separator plate forms a third group of channels for conducting coolant with the first separator plate, and the third separator plate forms the second sub-set of channels of the first set and the second sub-set of channels of the second set with the second separator plate; and
a second group of channels formed on a second side of the membrane electrode assembly for conducting a second reactant,
wherein the first group of channels is configured as a conventional flow field by opening all the manifolds, and wherein the first group of channels is configured as an interdigitated flow field by closing the first output manifold and the second input manifold.

14. The fuel cell assembly of claim 13, wherein the first sub-set of channels of the first set is connected to the first input manifold, and the second sub-set of channels of the first set is connected to the first output manifold.

15. The fuel cell assembly of claim 14, wherein, in the first set of channels, the holes fluidly connect each channel in the first sub-set and the corresponding channel in the second sub-set, wherein the holes are defined adjacent to the output manifold.

16. The fuel cell assembly of claim 13, wherein the second sub-set of channels of the second set is connected to the input manifold of the second set of channels, and the first sub-set of channels of the second set is connected to the output manifold of the second set of channels.

17. The fuel cell assembly of claim 16, wherein, in the second set of channels, the holes fluidly connect each channel in the first sub-set and the corresponding channel in the second sub-set, wherein the holes are defined adjacent to the input manifold.

18. The fuel cell assembly of claim 13, wherein the second group of channels includes a first set and a second set of channels alternatively positioned, and wherein each of the two sets of channels are connected between at least one of the first input manifold and the second input manifold, and the first output manifold and the second output manifold, each manifold being controlled by a valve.

* * * * *